(12) United States Patent
Grivna

(10) Patent No.: US 10,413,026 B1
(45) Date of Patent: Sep. 17, 2019

(54) REACHER ATTACHMENT FOR CANE

(71) Applicant: Gerald J. Grivna, Jay, OK (US)

(72) Inventor: Gerald J. Grivna, Jay, OK (US)

( * ) Notice: Subject to any disclaimer, the term of this patent is extended or adjusted under 35 U.S.C. 154(b) by 0 days.

(21) Appl. No.: 15/980,105

(22) Filed: May 15, 2018

Related U.S. Application Data

(60) Provisional application No. 62/506,730, filed on May 16, 2017.

(51) Int. Cl.
| *A45B 3/00* | (2006.01) |
| *F16B 7/04* | (2006.01) |
| *F16M 13/02* | (2006.01) |
| *B25J 1/04* | (2006.01) |

(52) U.S. Cl.
CPC .............. *A45B 3/00* (2013.01); *F16B 7/0433* (2013.01); *F16M 13/02* (2013.01); *B25J 1/04* (2013.01)

(58) Field of Classification Search
CPC .................................... A45B 3/00; A45B 9/04
USPC ..................................................... 135/80, 81
See application file for complete search history.

(56) References Cited

U.S. PATENT DOCUMENTS

| 2,371,246 | A | * | 3/1945 | McGrory et al. | .... A61H 3/0288 |
| | | | | | 135/70 |
| 2,501,890 | A | * | 3/1950 | Desso, Sr. | ............ A61H 3/0288 |
| | | | | | 135/70 |
| 3,170,475 | A | * | 2/1965 | Forbes | ....................... A45B 3/00 |
| | | | | | 135/80 |
| 3,374,022 | A | * | 3/1968 | Tagg | ........................ A45B 3/00 |
| | | | | | 294/103.1 |
| 4,253,479 | A | * | 3/1981 | Laurent | .................... A45B 3/00 |
| | | | | | 135/69 |
| 5,176,160 | A | | 1/1993 | Osborn | |
| 5,433,234 | A | | 7/1995 | Lapere | |
| 6,058,953 | A | | 5/2000 | Stefanelli | |
| 6,550,490 | B1 | | 4/2003 | Morton et al. | |
| 8,602,917 | B2 | * | 12/2013 | Bennett | ............. A63B 57/0037 |
| | | | | | 473/386 |
| 8,714,170 | B1 | | 5/2014 | Bonne et al. | |
| 9,254,021 | B2 | | 2/2016 | Paybins et al. | |
| 9,456,670 | B2 | | 10/2016 | Wood | |
| 2012/0060878 | A1 | | 3/2012 | Thiessens | |
| 2013/0257072 | A1 | | 10/2013 | Chrysler | |
| 2014/0240963 | A1 | * | 8/2014 | Roberts | .................... A45B 3/00 |
| | | | | | 362/102 |

* cited by examiner

*Primary Examiner* — Noah Chandler Hawk
(74) *Attorney, Agent, or Firm* — Head, Johnson, Kachigian & Wilkinson, PC

(57) ABSTRACT

A reacher attachment assembly of use with a cane. The attachment assembly attaches a reacher to a cane such that the reacher is stored out of the way of the tip of the cane so as not to interfere with the cane when the reacher is not in use, but allows the reacher to be slid into position for use so that the cane tip does not interfere with the reacher. The attachment assembly may comprise a distal mount securely attached to the cane and slidingly attached to the reacher, a spring mount securely attached to the reacher, and a spring between the distal mount and the spring mount, such that the spring retains the reacher out of the way when not needed but allows the reacher to be extended downward relative to the cane for use.

10 Claims, 15 Drawing Sheets

REACHER ATTACHMENT FOR CANE

CROSS REFERENCE

This application is based on and claims priority to U.S. Provisional Application No. 62/506,730 filed May 16, 2017.

BACKGROUND OF THE INVENTION

Field of the Invention

This invention relates generally to a reacher attachment for a cane, and more particularly, but not by way of limitation, to an assembly for attaching a reacher/gripper device to a walking stick or cane.

Description of the Related Art

Canes or walking sticks are commonly used by people with limited mobility.

The same limited mobility that can necessitate the use of a cane may make it difficult for such people to bend down to pick small items up from the ground or other low surface. Reacher or grabber devices may be used for this purpose, with such devices typically being elongate and having a trigger mechanism at one end and a grabber or pincher mechanism at the other.

Such reacher or grabber devices may, however, be unwieldy and difficult to keep on one's person at all times, particularly if the user also requires the use of a cane or walking stick. In an attempt to overcome this difficulty, combination canes and grabbers are known in the art, where a single device can be used as a cane or walking stick and also as a reacher, as needed.

Such devices, however, have several inherent limitations. For example, such devices are an integral unit and cannot accommodate an existing cane or an existing reacher. A user who is already comfortable with using one device or the other must then get used to a new device to take advantage of such a combination device. Furthermore, if either the cane portion or the reacher portion breaks, it cannot be replaced in such integral devices. Rather, the entire device must be replaced, despite the fact that the other function is intact.

Based on the foregoing, it is desirable to provide an attachment assembly for attaching a reacher to an existing cane.

It is further desirable for such attachment assembly to either accommodate an existing reacher or be integral with a reacher device.

It is further desirable for such attachment assembly to be reversible to allow replacement of either the cane portion or the reacher portion.

It is further desirable for such an attachment assembly to allow the cane to be used without interference by the reacher portion.

It is further desirable for the gripper assembly to be retained off the floor when not in use to keep the gripper assembly clean.

SUMMARY OF THE INVENTION

In general, in a first aspect, the invention relates to a reacher attachment assembly for use with a cane, the assembly comprising: a distal mount for attaching a reacher to the cane, where the distal mount is capable of attaching to the cane securely such that the cane cannot slide through the distal mount and the distal mount is capable attaching to the reacher loosely such that the reacher can slide through the distal mount; a spring mount capable of attaching to the reacher securely such that the reacher cannot slide through the spring mount; and a spring between the distal mount and the spring mount. The reacher attachment assembly may further comprise the reacher.

The distal mount may comprise a back bracket, a middle bracket, and a front bracket, where the back bracket and middle bracket are capable of securely holding the cane therebetween and the middle bracket and front bracket are capable of loosely holding the reacher therebetween. The spring mount may comprise a back bracket and a front bracket, where the back bracket and the front bracket are capable of securely holding the reacher therebetween.

The reacher attachment assembly may further comprise a stabilizer. The stabilizer may be capable of attaching to the cane loosely such that the cane can slide through the stabilizer and to the reacher securely such that the reacher cannot slide through the stabilizer. Alternately, the stabilizer may be capable of attaching to the cane securely such that the cane cannot slide through the stabilizer and to the reacher loosely such that the reacher can slide through the stabilizer. The stabilizer may comprise a back bracket, a middle bracket, and a front bracket, where the back bracket and middle bracket are capable of holding the cane therebetween and the middle bracket and front bracket are capable of holding the reacher therebetween.

The reacher attachment assembly may further comprise a locking mechanism capable of attaching to the reacher, where the locking mechanism is capable of allowing use of the reacher when in a first position and preventing use of the reacher when in a second position. The locking mechanism may comprise a push rod, a push arm, and a locking rod, where the push arm has a first end to which the push rod is perpendicularly attached, the push arm has a second end to which the locking rod is perpendicularly attached, and the push rod and the locking rod are parallel. The push rod may be slidably attached to the reacher such that pushing the push rod changes the locking mechanism from the first position to the second position or from the second position to the first position. The locking rod may be positioned such that it interferes with a trigger of the reacher when the locking mechanism is in place on the reacher and is in the second position.

Figure 1:
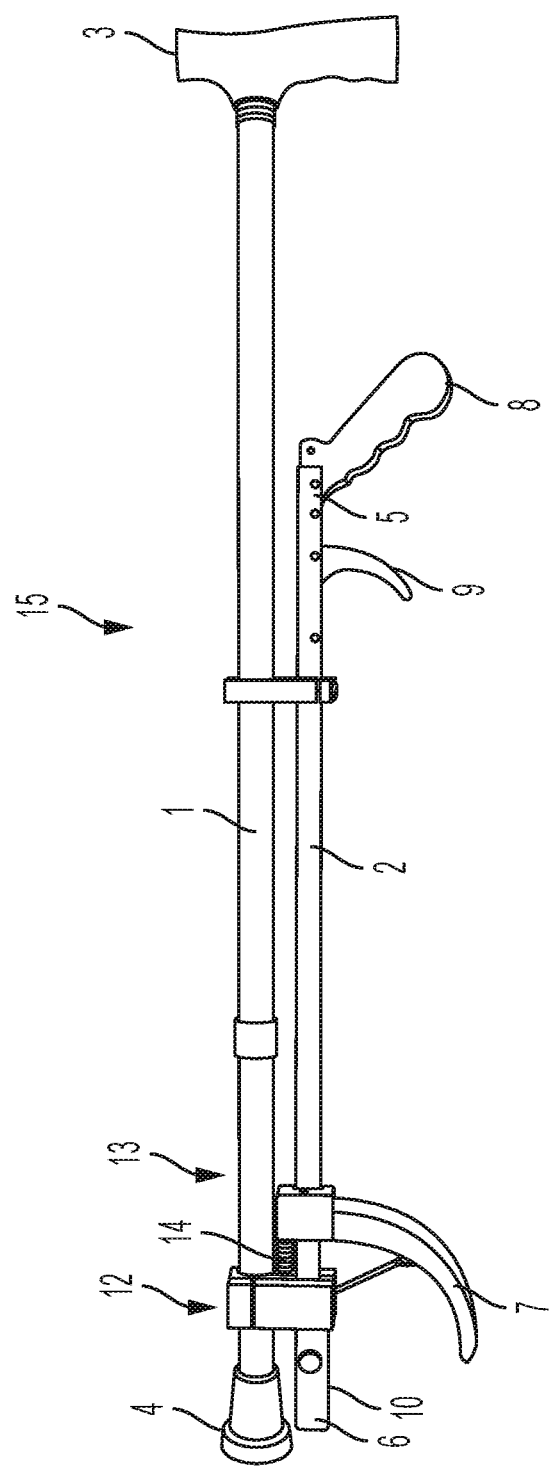
FIG. 1 is a side view of a cane with a reacher attached thereto via a reacher attachment assembly.
Figure 2:
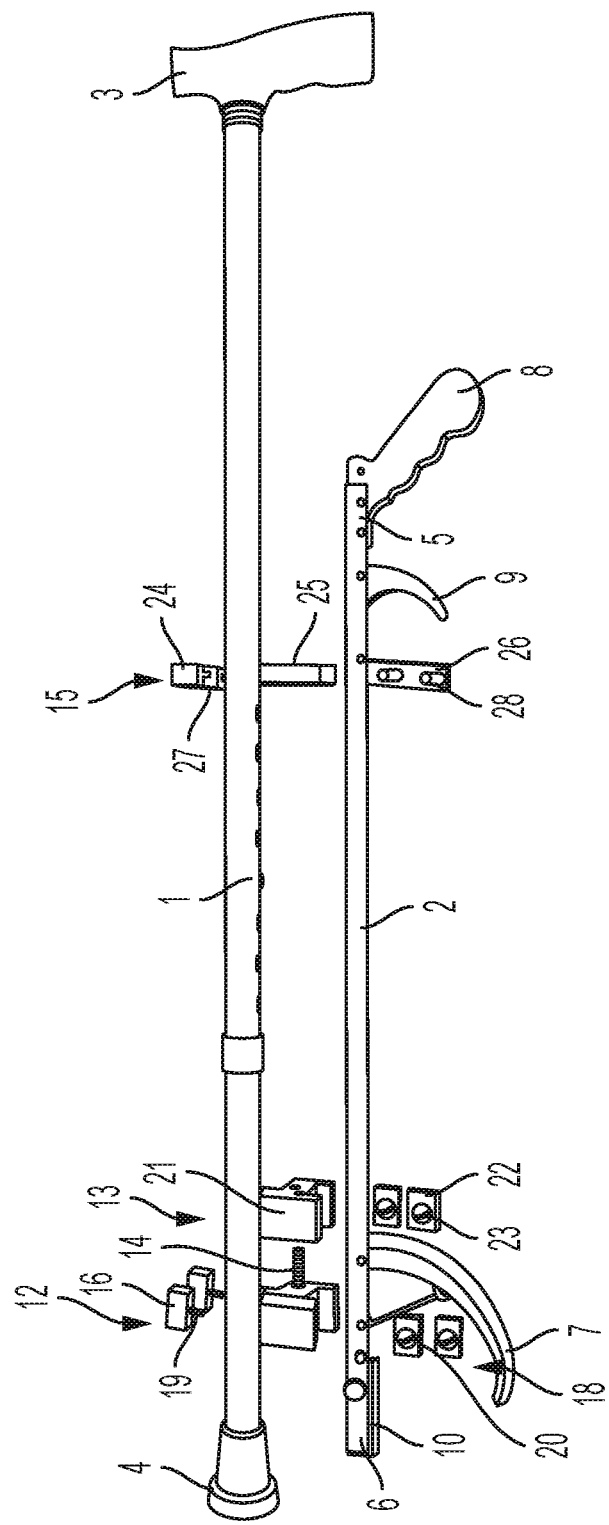
FIG. 2 is an exploded side view of the same.
Figure 3:
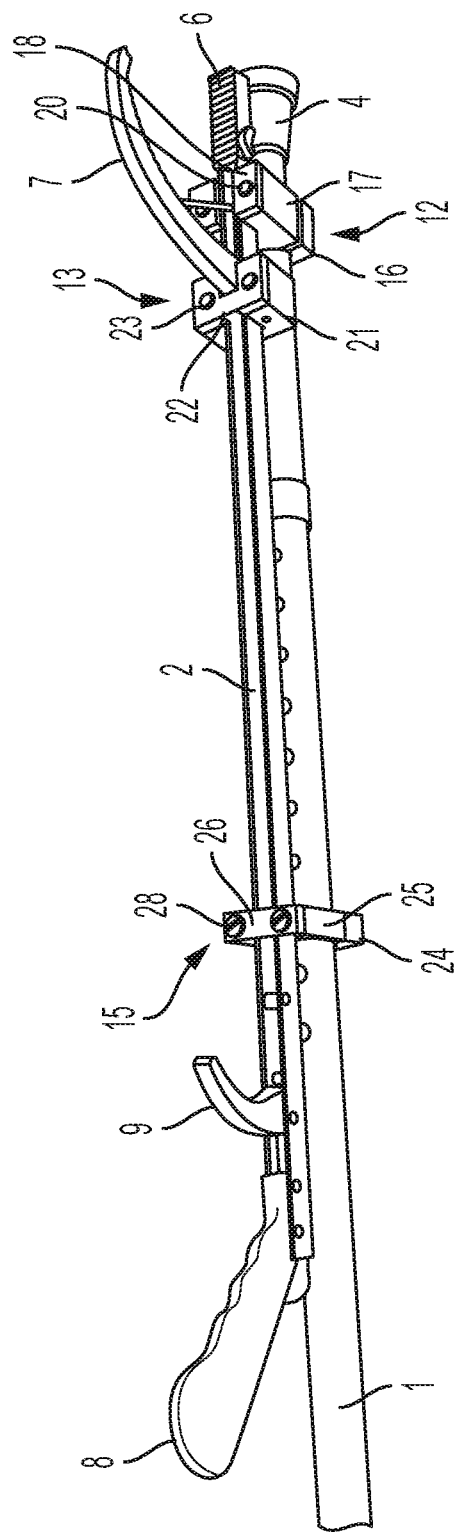
FIG. 3 is a partial perspective view of the same.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a cane 1, a reacher 2, and an attachment assembly for attaching the reacher 2 to the cane 1. The cane 1 may be any style cane of any desired material, and may be manufactured and sold specifically for use with the reacher 2 and the attachment assembly or may be an existing cane to which the reacher 2 is applied via the attachment assembly. The cane 1 may be elongate and may have a proximal end 3 and a distal end 4, where the user holds the proximal end 3 and places the distal end 4 against the ground during use. The proximal end 3 may have a separate or integral handle, while the distal end 4 may have a separate or integral tip. If separate, the handle and/or tip may be made of the same material as the body of the cane 1 or may be made of different material, such as rubber or other resilient material, as desired.

The reacher 2 may likewise be any style and of any desired material, and may similarly be manufactured and sold with the attachment assembly, either with or without the cane, or may be a separate, existing reacher that is attached to the cane 1 via the attachment assembly. In particular, the elements of the attachment assembly may be manufactured with, permanently or semi-permanently attached to, or otherwise form a part of the reacher 2, or the reacher 2 may be wholly separate from the attachment assembly when the attachment assembly is not in use. The reacher 2 may be elongate and may have a proximal end 5 and a distal end 6, where the use holds the reacher 2 at or near the proximal end 5 and grips items with a gripper assembly 7 located at or near the distal end 6 during use. For example, a handle 8 and a trigger 9 may be located at or near the proximal end 5. The trigger 9 may be connected to the gripper assembly 7 such that actuating the trigger 9 may cause the gripper assembly 7 to contract, allowing the user to grip an item with the gripper assembly 7. The reacher 2 may have an adjustable tip assembly 10 located at the distal end 6, which may allow the user to extend the length of the reacher 2 as desired. The distal end 6 of the reacher 2 may terminate in a magnet 11 for picking up small metallic objects.

The attachment assembly may comprise a distal mount 12, a spring mount 13, and a spring 14. The attachment assembly may also comprise a stabilizer 15. The distal mount 12 may attach securely to the cane 1, while the spring mount 13 may attach securely to the reacher 2. The spring 14 may extend between the distal mount 12 and the spring mount 13, allowing the reacher 2 to be moved linearly a short distance relative to the cane 1. The distal mount 12 may likewise attach to the reacher 2, but slidingly rather than securely, thus connecting the reacher 2 to the cane 1 but allowing it to slide along a linear path relative to the cane 1. The distal mount 12 may attach near the distal end 4 of the cane. The spring mount 13 may likewise attach near the distal end 6 of the reacher 2, although the spring mount 13 may specifically be located nearer the center of the reacher 2 than the distal mount 12. The stabilizer 15 may attach securely to the reacher 2 near the proximal end 5 and may attach slidingly to the cane 1, again connecting the reacher 2 to the cane 1 but allowing the cane 1 to slide along a linear path relative to the reacher 2. Alternately, the stabilizer 15 may attach securely to the cane 1 and may attach slidingly to the reacher 2, again connecting the reacher 2 to the cane 1 but allowing the reacher 2 to slide along a linear path relative to the cane 1. Either way, the combination of the distal mount 12 and the stabilizer 15, both attached securely to one and slidingly to the other of the cane 1 and reacher 2, may maintain the cane 1 and the reacher 2 in parallel, while allowing the reacher 2 to slide linearly along a path parallel to the cane 1. The spring mount 13 separated from the distal mount 12 by the spring 14 maintains the position of the reacher 2 relative to the cane when the cane 1 is being held upright and no downward pressure is being applied on the reacher 2, but allows the reacher 2 to be moved to an extended position for use by exerting downward pressure on the reacher 2, thus compressing the spring 14.

The distal mount 12 may comprise a back bracket 16, a middle bracket 17, and a front bracket 18. The back bracket 16 and the middle bracket 17 may be sized and shaped such that the cane 1 may be securely held therebetween, such as between channels or grooves in either or both the back bracket 16 and the middle bracket 17. The back bracket 16 and the middle bracket 17 may be held together via a pair of hex bolts 19, as shown, or via any other desired attachment device or devices. The channels or grooves in back bracket 16 and/or middle bracket 17 may be small enough that the cane 1 cannot slide therethrough. The middle bracket 17 and the front bracket 18 may likewise be sized and shaped such that the reacher 2 may be loosely held therebetween, such as in a channel or groove in either or both of the middle bracket 17 and the front bracket 18. The middle bracket 17 and the front bracket 18 may be held together via a pair of screws 20, as shown, or via any other desired attachment device or devices. The channel or groove between the middle bracket 17 and the front bracket 18 may be large enough that the reacher 2 may slide freely therein. The front bracket 18 may be sized and shaped such that it does not interfere with the operation of the grabber assembly 7. For example, the front bracket 18 may have a two-part construction, as shown.

The spring mount 13 may comprise a back bracket 21 and a front bracket 22. The back bracket 21 and the front bracket 22 may be sized and shaped such that the reacher 2 may be securely held therebetween, such as between channels or grooves in either or both the back bracket 21 and the front bracket 22. The back bracket 21 and the front bracket 22 may be held together via a pair of screws bolts 23, as shown, or via any other desired attachment device or devices. The channels or grooves in back bracket 21 and/or front bracket 22 may be small enough that the reacher 2 cannot slide therethrough. The front bracket 22 may be sized and shaped such that it does not interfere with the operation of the grabber assembly 7. For example, the front bracket 2 may have a slot for the grabber assembly 7, as shown.

Figure 4:
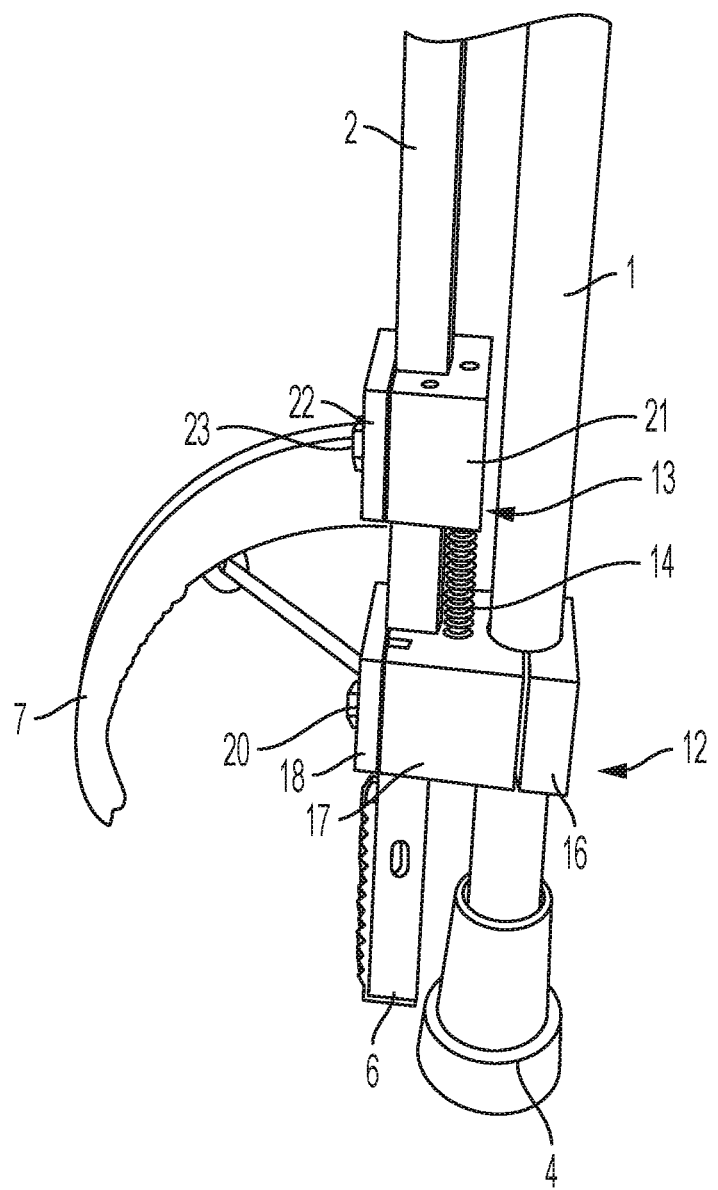
FIG. 4 is a perspective view of the distal end of the cane with the reacher in a relaxed position.
Figure 5:
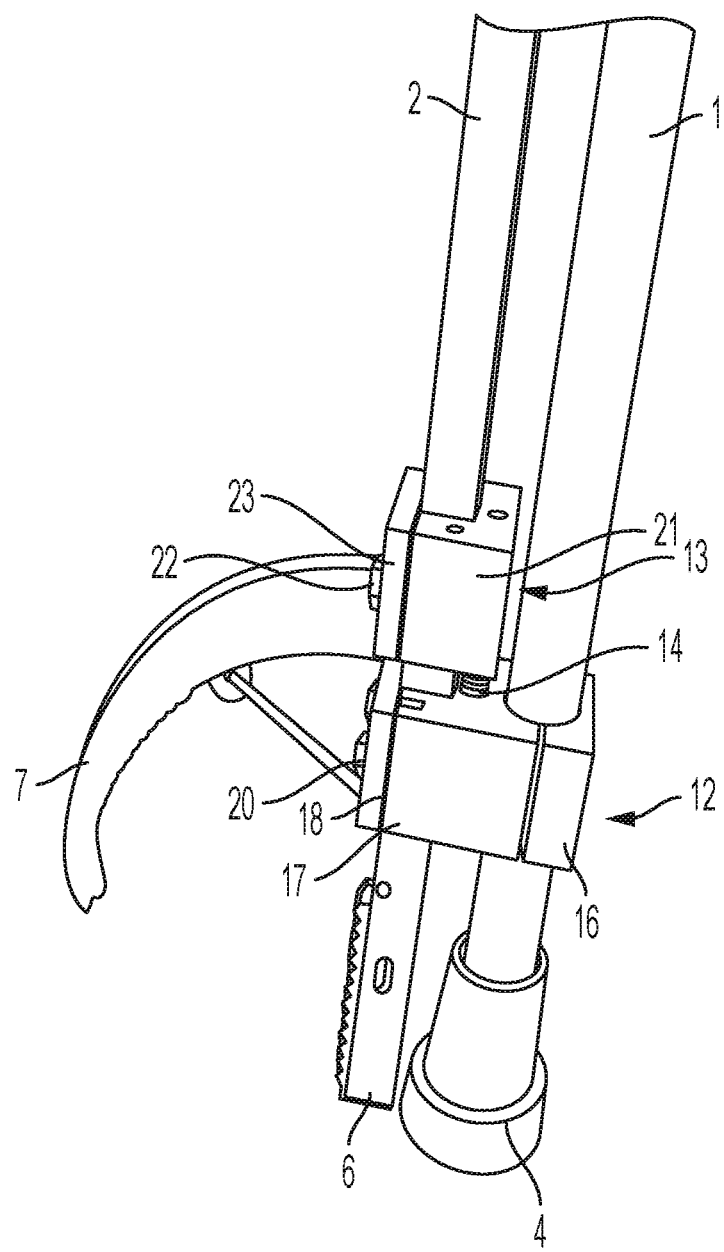
FIG. 5 is a perspective view of the distal end of the cane with the reacher in an extended position.
Figure 6:
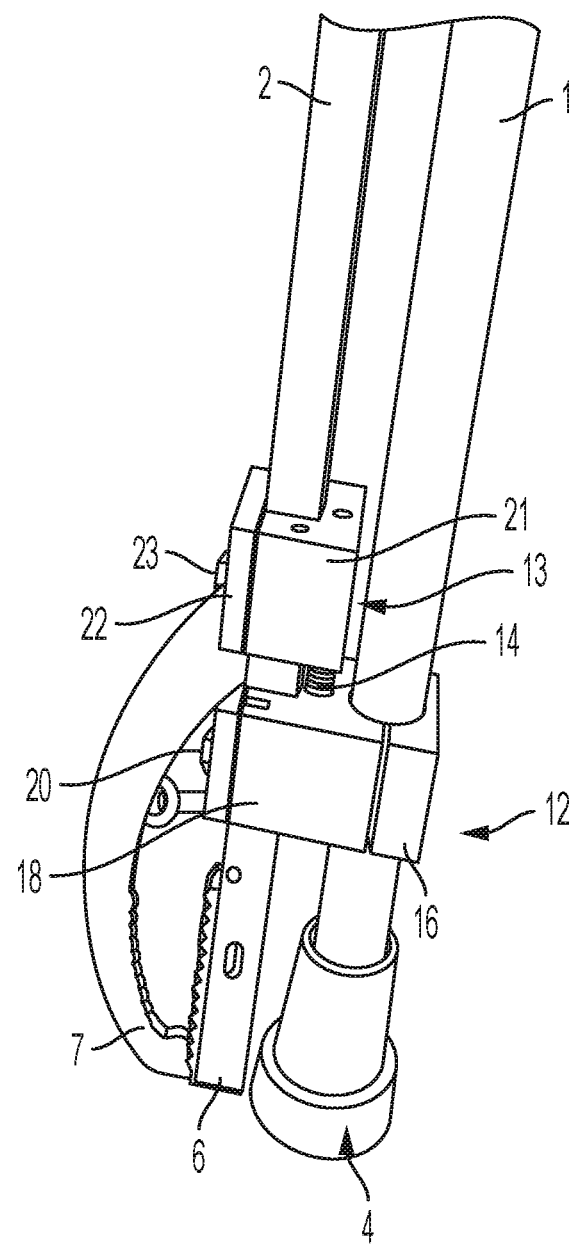
FIG. 6 is a perspective view of the distal end of the cane with the reacher in the extended position and the gripper activated.
Figure 7:
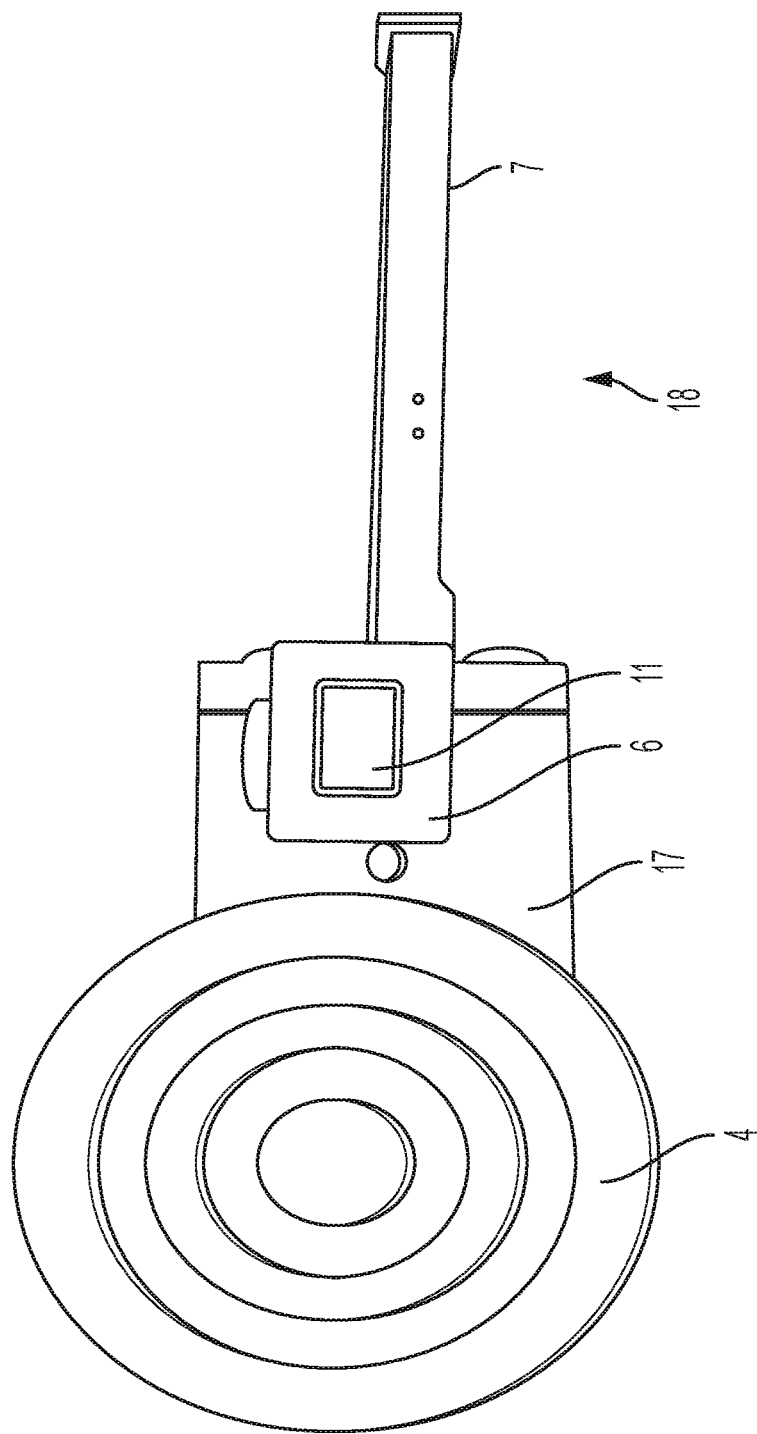
FIG. 7 is a bottom view of the cane with the reacher attached via the reacher attachment assembly.
Figure 8:
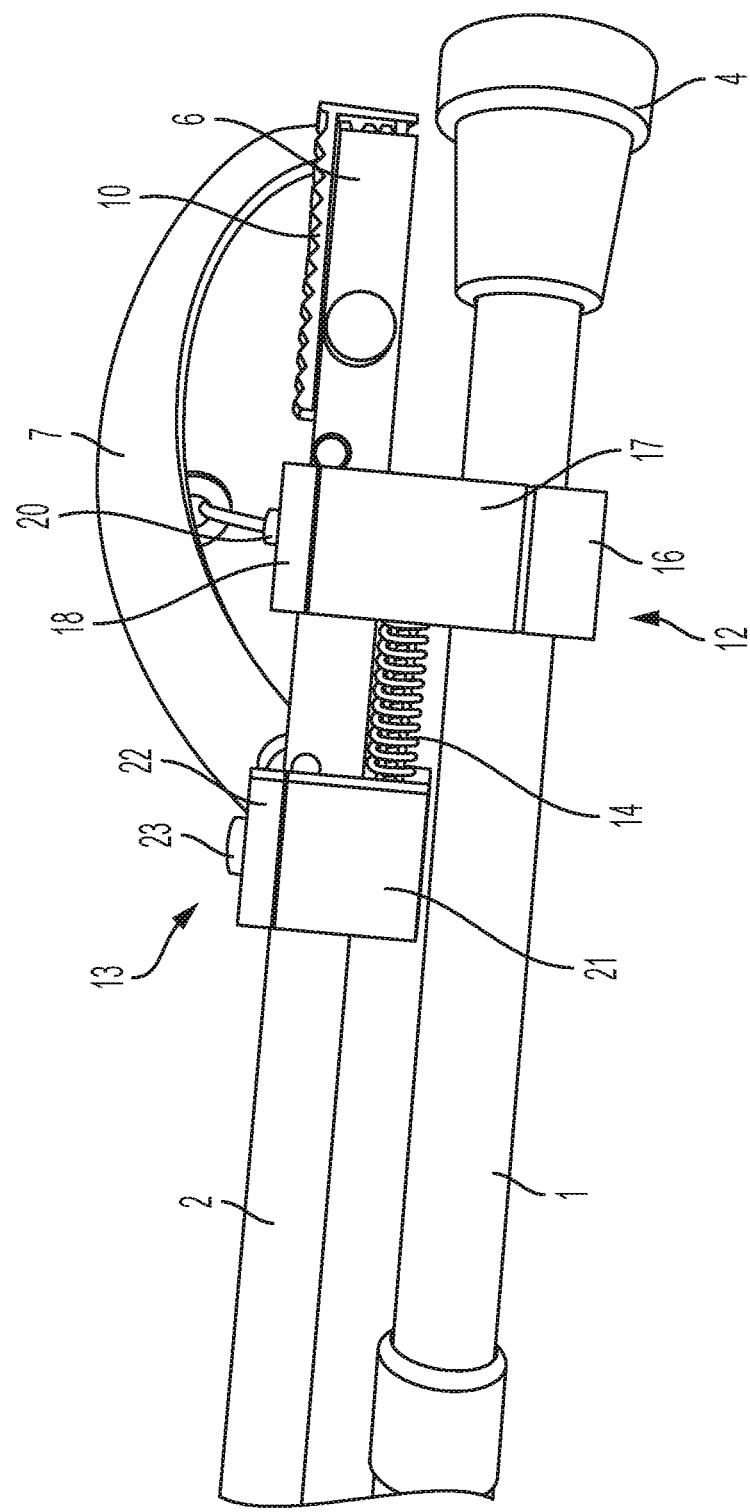
FIG. 8 is a side view of the distal end of the cane with the reacher tip in an alternate position.

The distal mount 12, spring mount 13, and spring 14 may all be sized and positioned such that the distal end 6 of the reacher 2 is inset from the distal end 4 of the cane 1 when the spring is relaxed, thus allowing the cane 1 to be used, even at an angle, without interference by the reacher 2. For example, the distal mount 12 may be secured to the cane 1 a first distance from the distal end 4, with the spring mount 13 secured a second distance from the distal end 6 of the reacher 2. Thus, the distal end 6 of the reacher 2 may be offset from the distal end 4 of the cane 1 by a distance approximately equal to the length of the spring 14, when relaxed, plus the difference in the first and second distances, when the attachment assembly is fully installed on both the cane 1 and the reacher 2, as shown in FIG. 4. For example, if the first distance and the second distance are the same, the offset may be equal to the length of the spring 14, when relaxed. The second distance may be dependent on the first distance and the length of the spring 14 when compressed, in that the distal mount 12 may be secured to the cane 1 and the spring mount 13 may be secured to the reacher 2 such that when the spring is fully compressed, the distal end 6 of the reacher 2 is generally even with the distal end 4 of the cane 1, as shown in FIG. 5. This allows the user to use the gripper assembly 7 to grip an object lying on the ground or other surface without interference by the cane 1.

Figure 9:
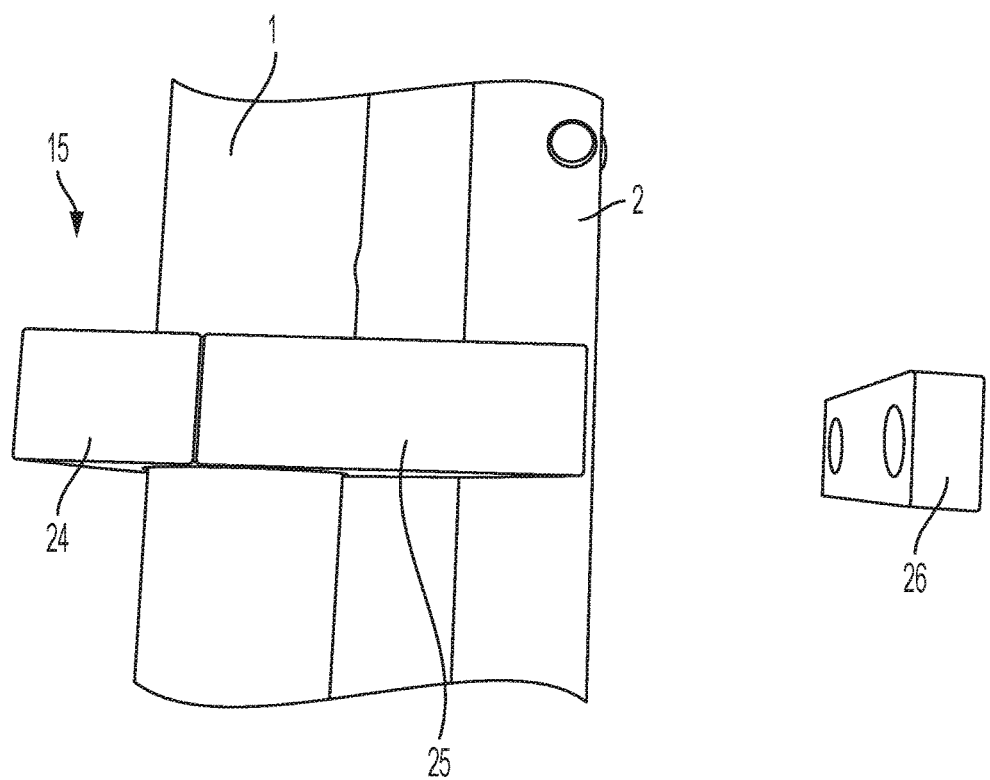
FIG. 9 is a partially exploded side view of one of the sections of the reacher attachment assembly.
Figure 10:
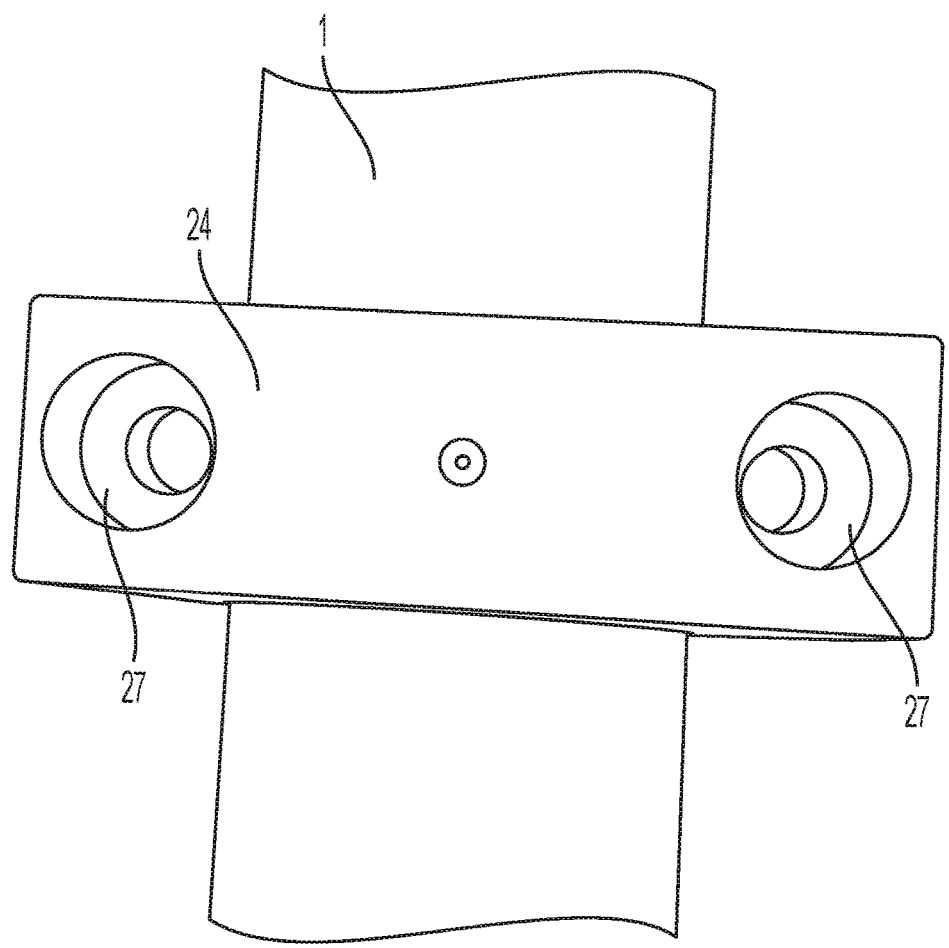
FIG. 10 is a back view of the section same.
Figure 11:
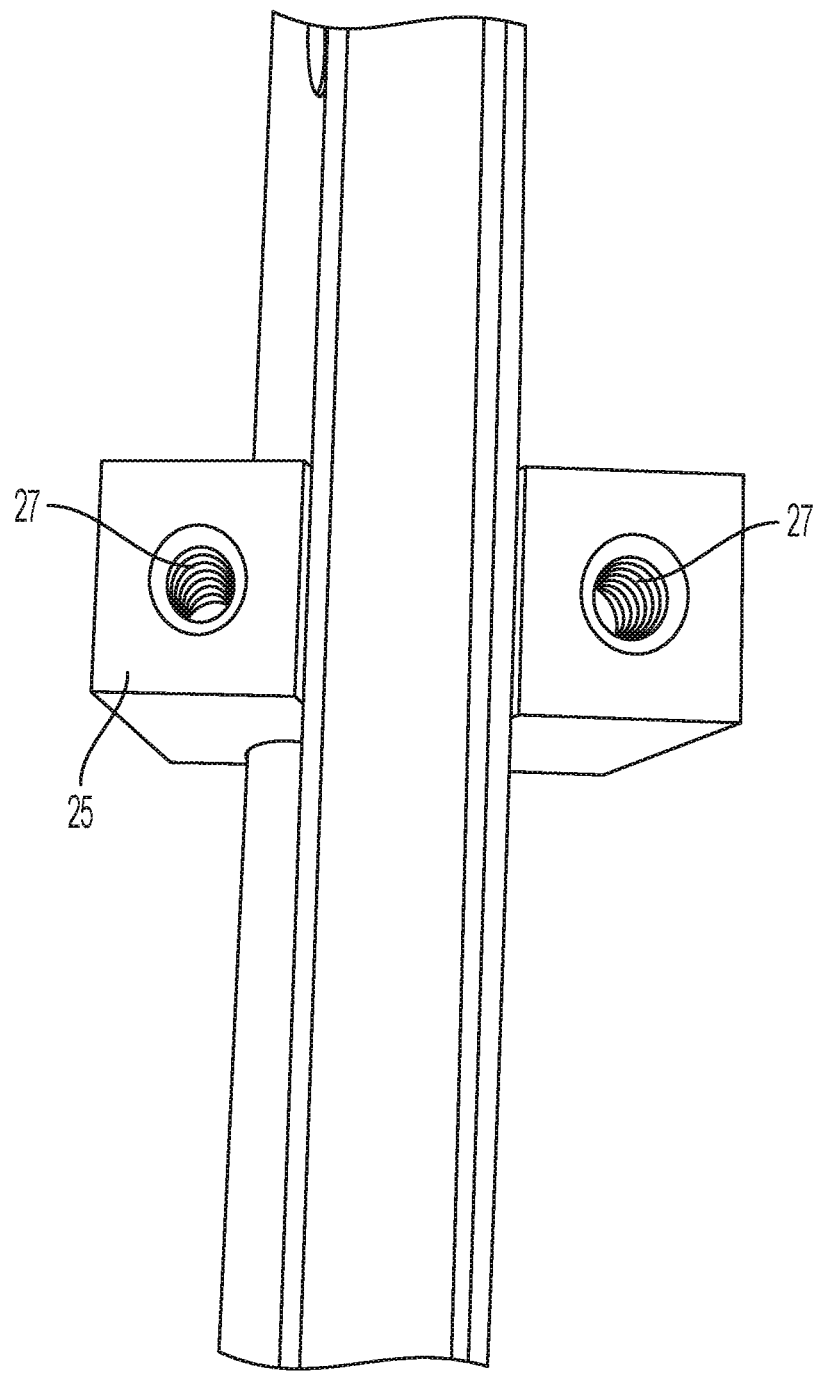
FIG. 11 is a front view of the same, with one component removed.

The stabilizer 15 may comprise a back bracket 24, a middle bracket 25, and a front bracket 26. The back bracket 24 and the middle bracket 25 may be sized and shaped such that the cane 1 may be loosely held therebetween, such as between channels or grooves in either or both the back bracket 24 and the middle bracket 25. The back bracket 24 and the middle bracket 25 may be held together via a pair of hex bolts 27, as shown, or via any other desired attachment device or devices. The stabilizer 15 is shown in detail in FIGS. 9, 10, and 11 to show a possible placement for the hex bolts 27, but this arrangement may also apply to the distal mount 12 and the spring mount 13. The channels or grooves in back bracket 24 and/or middle bracket 25 may be large enough that the cane 1 may slide freely therethrough. The middle bracket 25 and the front bracket 26 may likewise be sized and shaped such that the reacher 2 may be securely held therebetween, such as in a channel or groove in either or both of the middle bracket 25 and the front bracket 26. The middle bracket 25 and the front bracket 26 may be held together via a pair of screws 28, as shown, or via any other desired attachment device or devices. The channel or groove between the middle bracket 25 and the front bracket 26 may be small enough that the reacher 2 cannot slide therethrough.

During use, the user may use the cane 1 as any normal cane, with the spring 14, and thus the reacher 2, in the relaxed position. The distal end 6 of the reacher 2 may be held by the spring 14 away from the distal end 4 of the cane 1, thus preventing the reacher 2 from interfering in the normal use of the cane 1. When the user wants to use the reacher 2 to pick up an object, the user may grip the handle 8 of the reacher 2 in addition to the proximal end 3 of the cane 1, and may slide the reacher 2 downward relative to the cane 1 into the extended position, compressing the spring 14 and bringing the distal end 6 of the reacher 2 toward the distal end 4 of the cane 1. The user may position the reacher 2 such that the object the user wishes to pick up is between the distal end 6 of the reacher 2 and the gripper assembly 7, and may squeeze the trigger 9 to activate the gripper assembly 7, thus gripping the object. The user may release the trigger 9 to release the object, and may allow the spring 14 to relax and the reacher 2 to return to the relaxed position to return to normal usage of the cane 1.

Figure 12A:
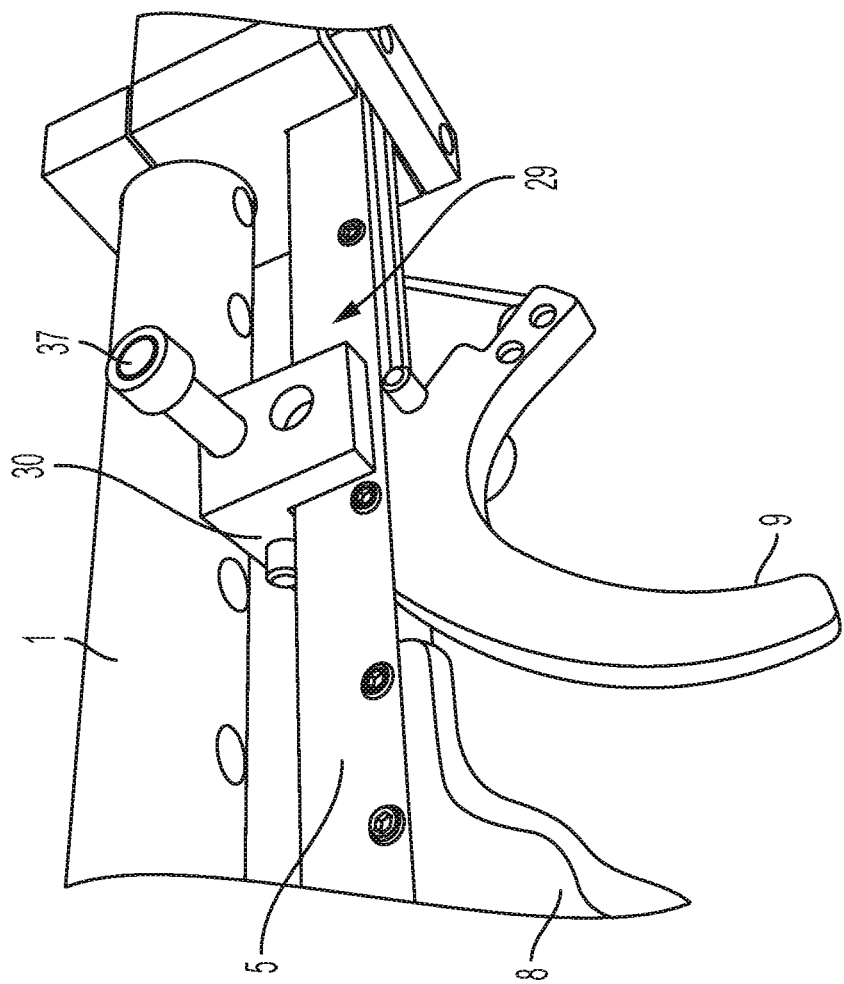
FIG. 12a is a perspective view of the cane with the reacher attached thereto with the locking mechanism attached to the reacher and in a locked position.
Figure 12B:
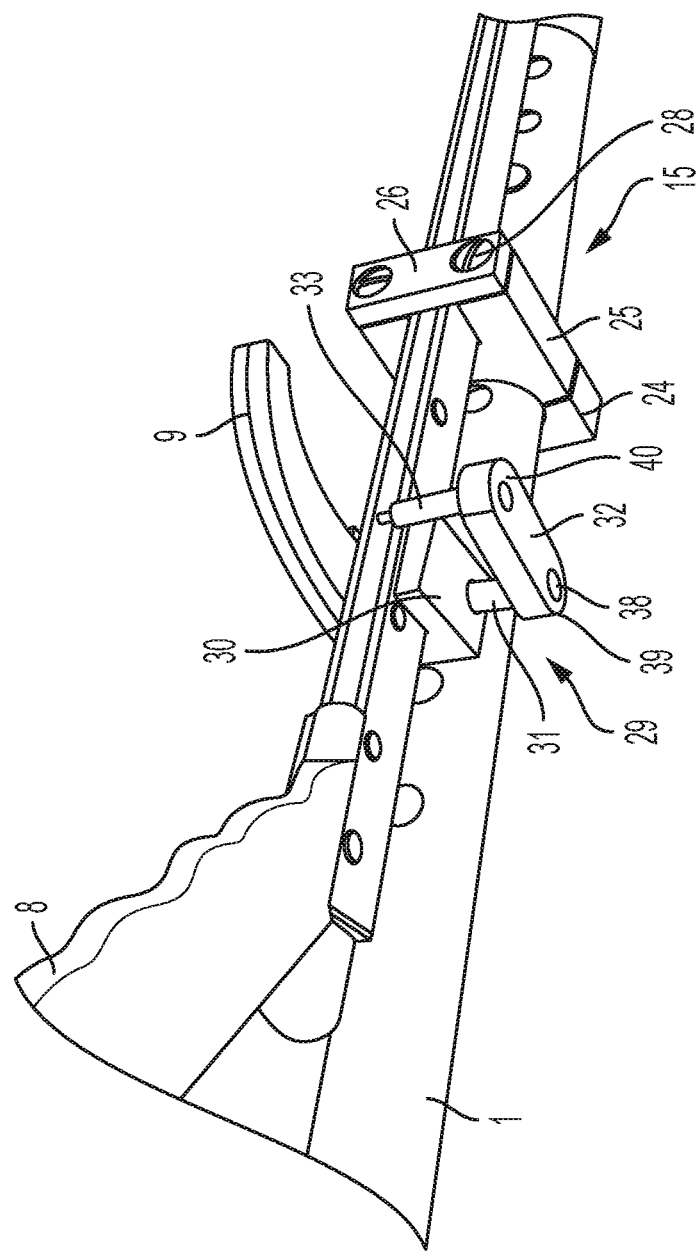
FIG. 12b is a perspective view of the cane with the reacher attached thereto with the locking mechanism attached to the reacher and in an unlocked position.

Optionally, the reacher 2 may include a locking mechanism 29, as shown in FIG. 12. The locking mechanism 29 may be mounted on or incorporated into the reacher 2 at or near the proximal end 5 near the trigger 9. The locking mechanism 29, shown in detail in FIG. 13, may include a housing 30, a push rod 31, a push arm 32, and a locking rod 33. The housing 30 may be generally U-shaped, as shown, or any other desired shape appropriate for attaching to the reacher 2, depending on the shape of the reacher 2 and the desired arrangement of parts. A screw or other attachment device 34 may secure the housing 30 to the reacher 2. The housing 30 may have a bore 35 running perpendicular to the reacher 2 when the locking mechanism 29 is in place on the reacher 2. Alternately, the housing 30 may be omitted if the locking mechanism 29 is incorporated into the reacher 2, in which case the bore 35 may run through the reacher 2 itself, perpendicular to the long axis of the reacher 2.

Figure 13:
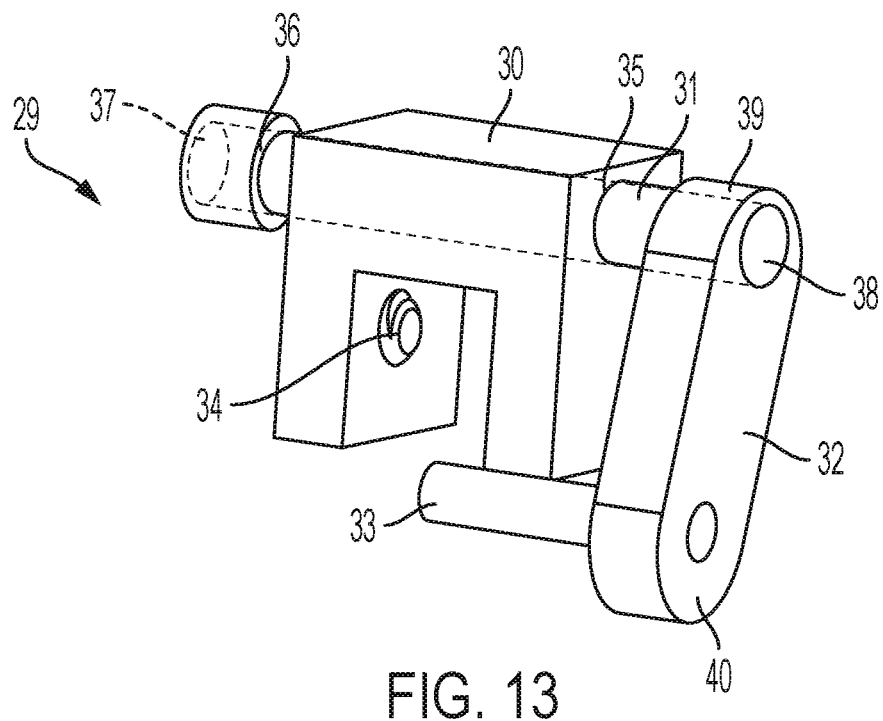
FIG. 13 is a perspective view of the locking mechanism with a circular cross-section.
Figure 14:
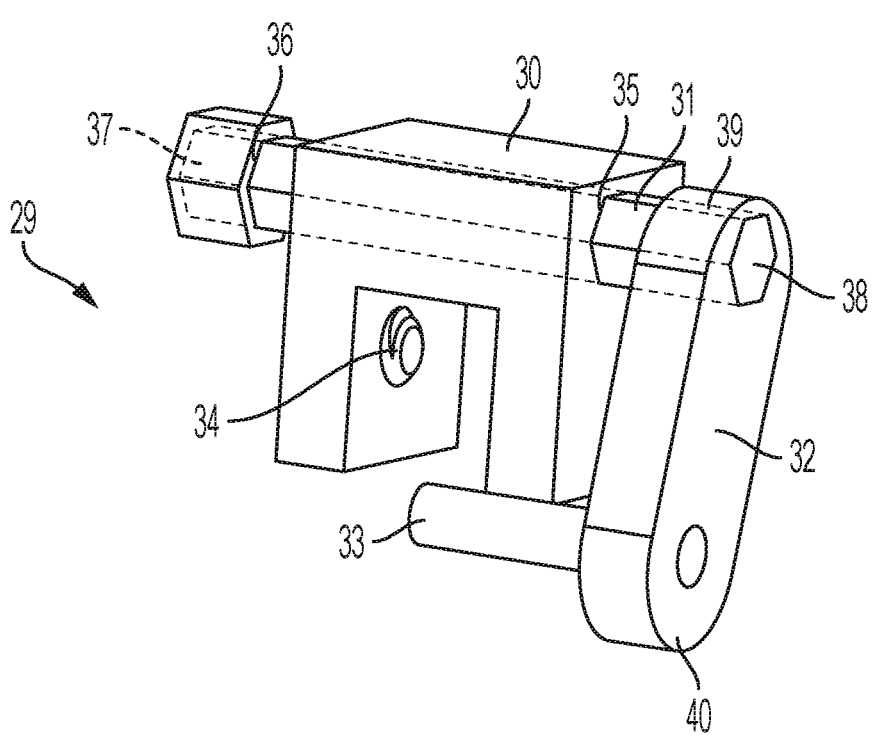
FIG. 14 is a perspective view of the locking mechanism with a hexagonal cross-section.
Figure 15:
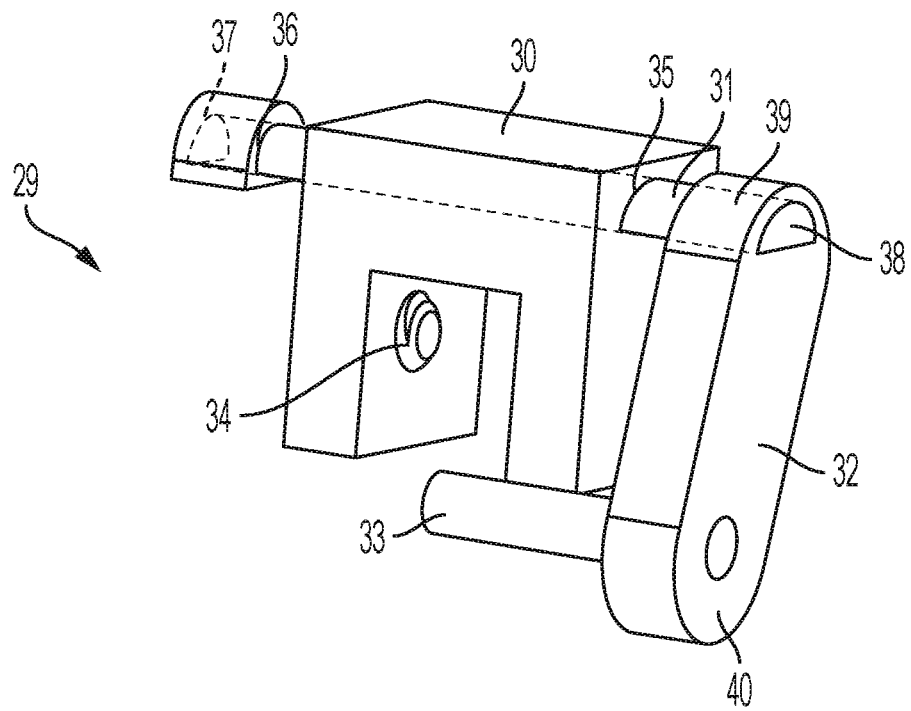
FIG. 15 is a perspective view of the locking mechanism with a semi-circular cross-section.
Figure 16:
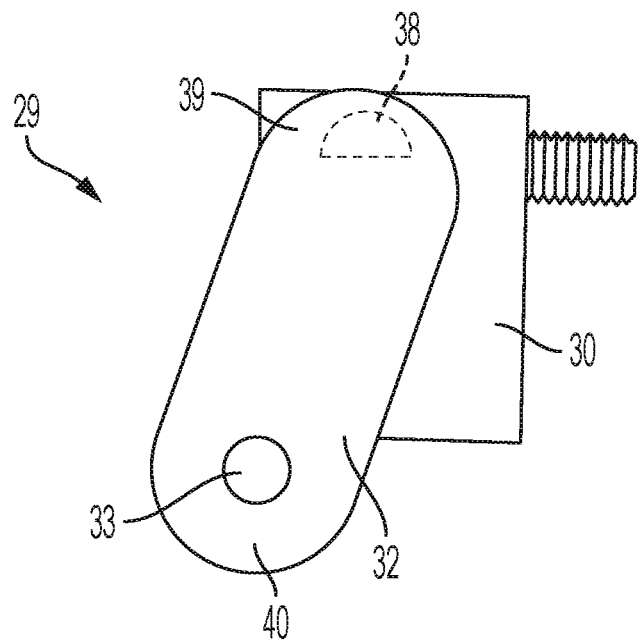
FIG. 16 is a side view of the locking mechanism.

The push rod 31 may run through the bore 35. The push rod 31 may be capable of freely sliding within the bore 35. The push rod 31 may terminate at one end 36 in a mechanical stop 37. The push rod 31 and the stop 37 may have any desired cross-sectional shape, including a circle, as shown in FIG. 13; a hexagon, as shown in FIG. 14; a half circle, as shown in FIG. 15; or any other desired shape. The push rod 31 and the stop 37 may both have the same cross-sectional shape, as shown, or may have different cross-sectional shapes. A non-cylindrical cross-sectional shape may provide the benefit of preventing rotation of the push rod 31 within the bore 35.

The opposite end 38 of the push rod 31 may terminate in a first end 39 of the push arm 32. The push arm 32 may be generally elongate with rounded ends, as shown, or any other desired elongate shape, running generally perpendicular to the push rod 31 and the reacher 2. The push arm 32 may be longer than the width of the housing 30 and/or reacher 2. The push arm 32 may lie at an angle relative to the housing 30 and/or reacher 2, as shown.

The locking rod 33 may be located at the second end 40 of the push arm 32. The locking rod 33 may be parallel to the push rod 31, extending in the same direction as the push rod 31 from the push arm 32, but on the opposite side of the reacher 2 when the locking mechanism 29 is in place on or incorporated into the reacher 2.

As noted above, the push rod 31 may be capable of freely sliding within the bore 35. The push rod 31 may slide between a first position, with the stop 37 directly adjacent the housing 30/reacher 2 and the push arm 32 spaced apart from the housing 30/reacher 2, and a second position, with the stop 37 spaced apart from the housing 30/reacher 2 and the push arm 32 directly adjacent the housing 30/reacher 2. The locking mechanism 29 may be positioned on the reacher 2 such that the locking rod 33 interferes with the trigger 9 when the locking mechanism 29 is in the second position, but may not interfere with the trigger 9 when the locking mechanism 29 is in the first position.

During use, when the locking mechanism 29 is in the first position and the user wishes to lock the trigger 9, the user may push on the push arm 32 to slide the locking mechanism 29 into the second position, thus allowing the locking rod 33 to interfere with the trigger 9 and prevent use of the reacher 2. When the locking mechanism 29 is in the second position and the user wishes to use the reacher 2, the user may push on the stop 37 to slide the locking mechanism 29 into the first position, thus removing the locking rod 33 from interfering with the trigger 9 and allowing use of the trigger 9.

Whereas, the devices and methods have been described in relation to the drawings and claims, it should be understood that other and further modifications, apart from those shown or suggested herein, may be made within the spirit and scope of this invention.

What is claimed is:

1. A reacher attachment assembly for use with a cane, the assembly comprising:
   a distal mount for attaching a reacher to the cane, where the distal mount is capable of attaching to the cane securely such that the cane cannot slide through the distal mount and the distal mount is capable attaching to the reacher loosely such that the reacher can slide through the distal mount;
   a spring mount capable of attaching to the reacher securely such that the reacher cannot slide through the spring mount;
   a spring between the distal mount and the spring mount; and
   a stabilizer.

2. The reacher attachment assembly of claim 1 where the distal mount comprises:
   a back bracket;
   a middle bracket; and
   a front bracket,
   where the back bracket and middle bracket are capable of securely holding the cane therebetween and the middle bracket and front bracket are capable of loosely holding the reacher therebetween.

3. The reacher attachment assembly of claim 1 where the spring mount comprises:
   a back bracket; and
   a front bracket,
   where the back bracket and the front bracket are capable of securely holding the reacher therebetween.

4. The reacher attachment assembly of claim 1 where the stabilizer is capable of attaching to the cane loosely such that the cane can slide through the stabilizer and the stabilizer is capable attaching to the reacher securely such that the reacher cannot slide through the stabilizer.

5. The reacher attachment assembly of claim 1 where the stabilizer is capable of attaching to the cane securely such that the cane cannot slide through the stabilizer and the stabilizer is capable attaching to the reacher loosely such that the reacher can slide through the stabilizer.

6. The reacher attachment assembly of claim 1 where the stabilizer comprises:
   a back bracket;
   a middle bracket; and
   a front bracket,
   where the back bracket and middle bracket are capable of holding the cane therebetween and the middle bracket and front bracket are capable of holding the reacher therebetween.

7. A reacher attachment assembly for use with a cane, the assembly comprising:
   a distal mount for attaching a reacher to the cane, where the distal mount is capable of attaching to the cane securely such that the cane cannot slide through the distal mount and the distal mount is capable attaching to the reacher loosely such that the reacher can slide through the distal mount;
   a spring mount capable of attaching to the reacher securely such that the reacher cannot slide through the spring mount;
   a spring between the distal mount and the spring mount; and
   a locking mechanism capable of attaching to the reacher, where the locking mechanism is capable of allowing use of the reacher when in a first position and preventing use of the reacher when in a second position.

8. The reacher attachment assembly of claim 7 where the locking mechanism comprises:
   a push rod;
   a push arm; and
   a locking rod,
   where the push arm has a first end to which the push rod is perpendicularly attached, the push arm has a second end to which the locking rod is perpendicularly attached, and the push rod and the locking rod are parallel.

9. The reacher attachment assembly of claim 8 where the push rod is slidably attached to the reacher such that pushing the push rod changes the locking mechanism from the first position to the second position or from the second position to the first position.

10. The reacher attachment assembly of claim 8 where the locking rod is positioned such that it interferes with a trigger of the reacher when the locking mechanism is in place on the reacher and is in the second position.

* * * * *